Figure 1:
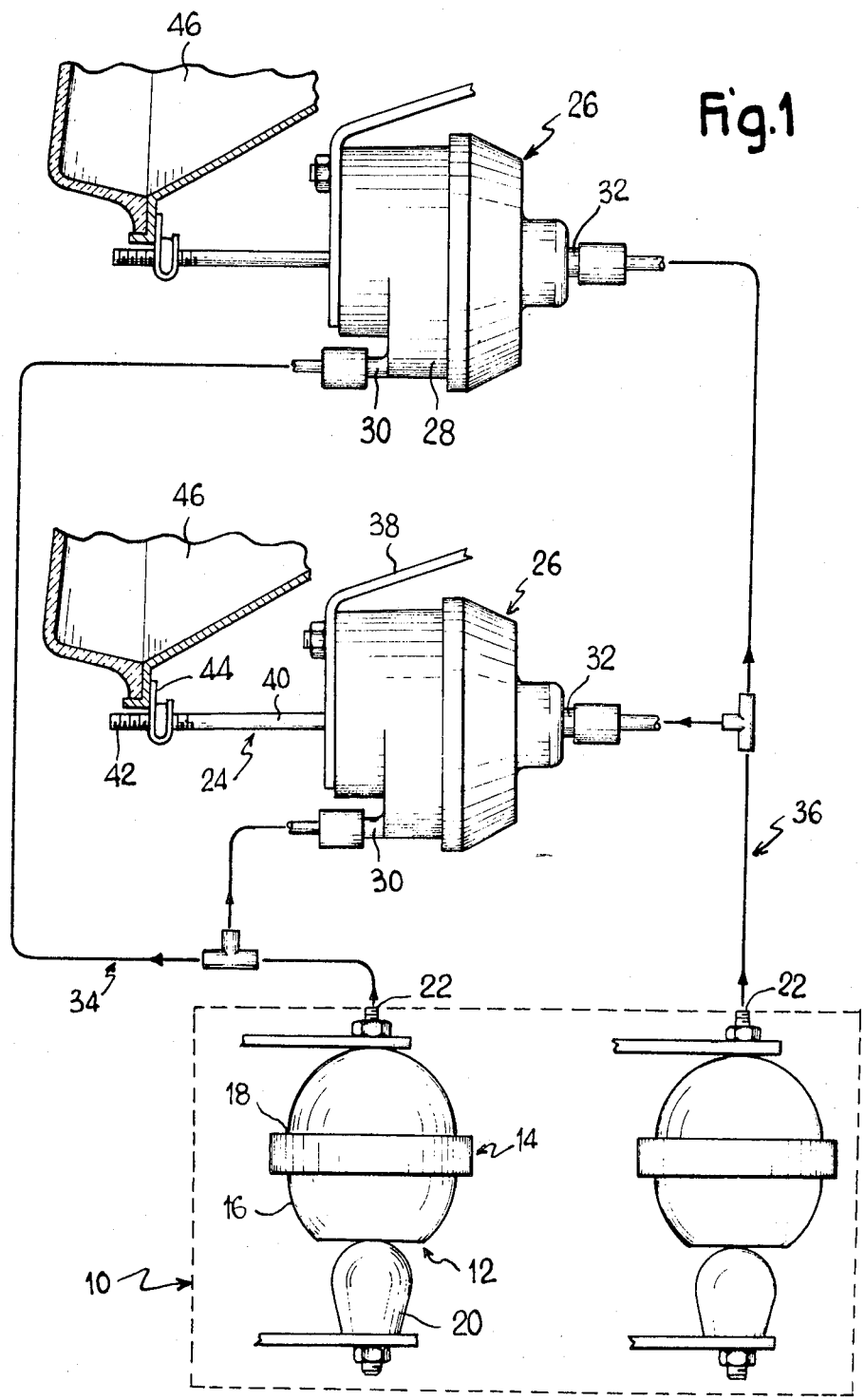

United States Patent
Rivolier

[15] 3,707,623
[45] Dec. 26, 1972

[54] SYSTEM FOR CONTROLLING THE ANGULAR POSITION OF THE HEADLIGHTS OF A VEHICLE

[72] Inventor: Charles Rivolier, Cesson, France
[73] Assignee: Societe Anonyme D.B.A.
[22] Filed: Nov. 29, 1971
[21] Appl. No.: 202,751

[30] Foreign Application Priority Data
Dec. 3, 1970 France .............................. 70-43444

[52] U.S. Cl. ............................. 240/7.1 LJ, 240/44.2
[51] Int. Cl. ............................ B60q 1/00, B60q 3/00
[58] Field of Search .......................... 240/7.1 LJ, 44.2

[56] References Cited
UNITED STATES PATENTS

| | | | |
|---|---|---|---|
| 3,336,470 | 8/1967 | Sombardier | 240/7.1 LJ |
| 3,370,162 | 2/1968 | Henry-Biabaud | 240/7.1 LJ |
| 3,402,287 | 9/1968 | Hindman | 240/7.1 LJ |
| 3,596,837 | 8/1971 | Todd et al. | 240/7.1 LJ |

Primary Examiner—Samuel S. Matthews
Assistant Examiner—Richard A. Wintercorn
Attorney—Ken C. Decker et al.

[57] ABSTRACT

A control system for modifying the angular position of the headlights of a vehicle, on both sides of a normal preset position, according to the trim of the latter. The system utilizes a fluid pressure differential control to sense vehicle load by sensing the depression of the body of the vehicle relative to the chassis. By communicating the fluid pressure to an actuator at the headlights of the vehicle, the angular relationship between the headlights and the vehicle body may be varied as a function of the vehicle trim. The actuator is provided with a movable assembly of annular nested abutments resiliently urged a fixed stop of the actuator casing, and with a piston connected to the headlights subjected on one hand to said pressure differential and on the other hand to the strength of a spring biasing said piston into engagement with said movable assembly of abutments.

5 Claims, 3 Drawing Figures

SYSTEM FOR CONTROLLING THE ANGULAR POSITION OF THE HEADLIGHTS OF A VEHICLE

The instant invention essentially relates to a control system for modifying the angular position of the headlights of a vehicle, on both sides of a normal preset position, according to the trim of the latter.

The invention concerns more particularly a control system for modifying the angular position of the headlights of a vehicle of the type comprising generating means responsive to the load acting upon at least one axle of the vehicle and designed for generating a differential control pressure which varies as a function of the trim of the vehicle, at least one receiving means comprising a casing, a movable assembly mounted in said casing and subjected on the one hand to said differential pressure and, on the other hand, to the action of a first preloaded biasing means and a force transmitting connecting having an adjustable length, located in said casing between said movable assembly and the headlights of the vehicle, for enabling said receiving means to vary the angular position of said headlights as a function of said differential pressure whereby the range of the headlights remains substantially constant.

With such devices as described hereinabove, it is apparent that any variation in the static or dynamic load acting upon the axles of the vehicle, from a normal or reference load distribution results in a corresponding variation of the angular position of the headlights of the vehicle on either sides of a preset value corresponding to said reference load distribution. Of course, the preset value is obtained by an appropriate manual adjustment of the length of said force transmitting connection effected when said movable assembly occupies in said casing its normal reference position, such as defined by the equilibrium between the force of the differential pressure of reference corresponding to said reference load distribution and the force of the initial preloading of said first preloaded biasing means. From the given definition of said reference position of said movable assembly, it will be easily inferred that said position is sensible in time to variations in said reference differential pressure and in said initial preloading of said preloaded biasing means so that such a control device is not very accurate and needs frequent manual resettings.

It has also been proposed control devices of the above mentioned type avoiding this drawback wherein the casing comprises a fixed abutment surface, said first biasing means normally urging the movable assembly against said abutment surface thereby defining a fixed reference position for said movable assembly whereby the manual setting may be effected only once.

It will be easily understood that with such a control device the movable assembly cannot move but on one side of its abutting position. In order that the device may work properly during the normal condition of use of the vehicle, said manual setting is effected when the vehicle is motionless and empty, in a condition where each axle is subjected to a minimal static load, in order to make said movable assembly responsive to any overload acting upon said axles.

However it happens with vehicles having an elastic suspension that during important brake applications transitory lightenings of the load acting upon at least one axle occur. The movable assembly come then to rest against the fixed abutment surface and the control of the angular position of the headlights is consequently ineffective.

The invention proposes a control system of the aforesaid type avoiding the above mentioned drawbacks wherein said movable assembly comprises movable abutment means urged into engagement with said fixed abutment by said first preloaded biasing means and a movable piston forming member connected to the headlights through said force transmitting connection and subjected on the one hand to said differential control pressure, and, on the other hand, to the action of second preloaded biasing means mounted so as to normally urge said piston forming member into engagement with said movable annular abutment means.

It will be easily understood that the piston forming member of such a control device may engage said movable abutment means, which, in turn, are abutting against the fixed abutment surface, thereby occupying its normal reference position about which said piston forming member is movable.

Figure 2:
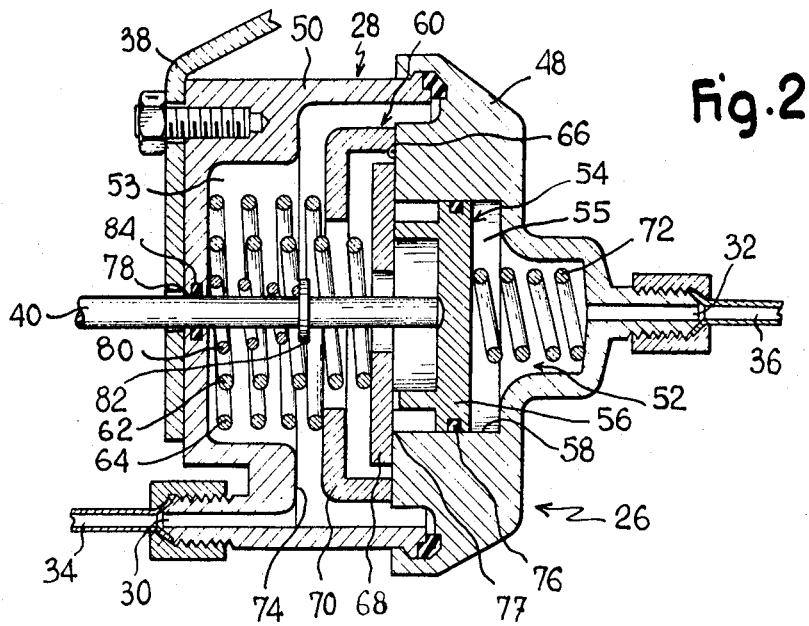
Figure 3:
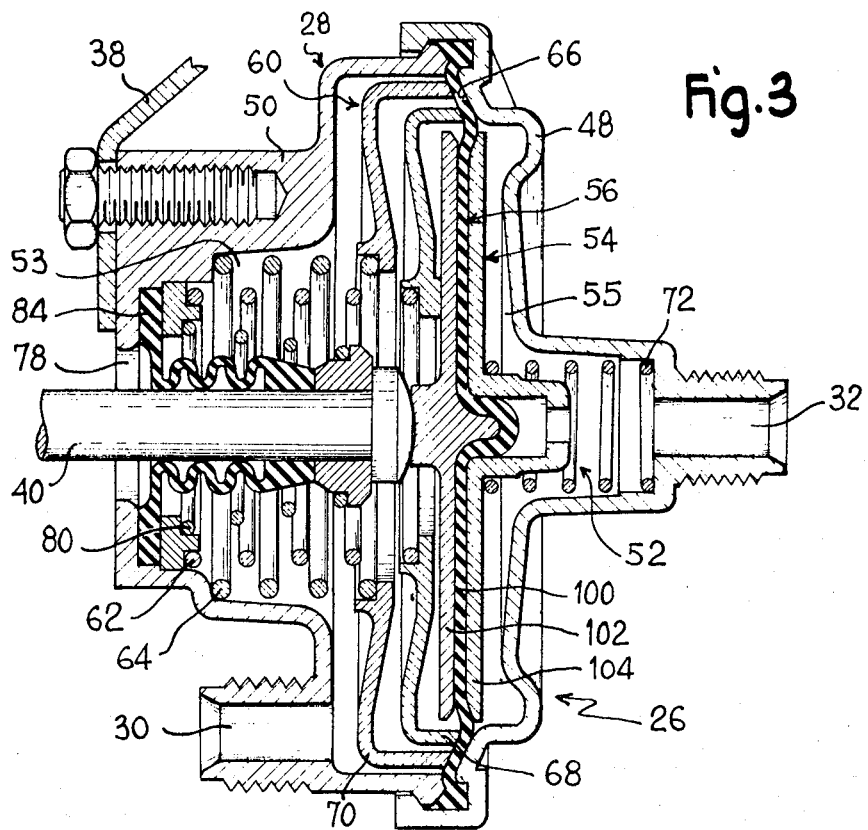

The invention will be more easily understood upon consideration of the following specification and with reference to the annexed drawings given merely by way of example and wherein:

FIG. 1 is a diagrammatic view with partial cross-section of a control device according to the invention, FIG. 2 is a diagrammatic cross-sectional view of a first embodiment of a receiving device according to the invention, FIG. 3 is a diagrammatic cross-sectional view of a second embodiment of a receiving device according to the invention.

Referring now to FIG. 1, the reference numeral 10 designates generating means designed for generating a differential control pressure variable as a function of the trim of a vehicle (not shown). The generating means 10 comprises two identical pneumatic compression units 12. Each compression unit 12 essentially comprises a piston 20 and a variable volume chamber 14, formed of a single diaphragm 16 sealingly secured on its outer edge on the annular edge of a bell-shaped casing 18 provided with an outlet port 22. The bell-shaped casings 18 are both secured to the vehicle body (not shown) whereas the two pistons 20 are positively connected by any convenient means to the front and rear axles of the vehicle, respectively. It will be easily understood that the mounting of both compression units 12 is such that any substantial displacement of the corresponding axle relative to the vehicle body, for example as a consequence of an important change in the load acting upon said axle, causes a corresponding variation in the internal volume of the chamber 14, and consequently a variation in the pressure level of the pneumatic fluid contained therein. The outlet ports 22 of the compression units 12 are respectively connected through two sealed isolated conduits 34 and 36 respectively, to two inlet ports 30 and 32 respectively provided in each housing 28 of two identical receiving means 26.

Each receiving means comprises a housing 28 which may be of plastic material and which is suitably secured by a fastening member 38 to the vehicle body. As will be explained herebelow, the receiving means 26 are capable of positioning a force transmitting connection 24 located between said receiving means of a headlight 46 under the action of the pressure differential between inlets ports 30 and 32. This pressure differential which will be designated "differential control pressure" in the course of the following description varies as a function of the load distribution upon the axles of the vehicle (i.e. of the trim of the latter).

In the illustrated embodiment, the force transmitting connection 24 includes a push-rod 40 which is threaded at its free end to be adjustably secured to a threaded lug 44 itself suitably secured by any convenient means on the headlight 46 so that any axial movement of push-rod 40 results in an angular displacement of headlight 46.

Other control devices may be imagined without departing from the invention which would comprise only one receiving means 26 connected to both headlights of the vehicle by means of a hydraulic or mechanical connection.

Referring now to FIG. 2 which discloses a particular embodiment of one of the receiving means diagrammatically shown at 26 in FIG. 1, the housing 28 comprises a bowl-shaped member 50 suitably secured to the fastening member 38 and a cover 48 sealingly secured on the outer annular edge of the bowl-shaped member 50 and defining therewith a fluid-tight cavity 52. A movable assembly designated by the general reference 54 is mounted within the housing 28 dividing cavity 52 into two independant opposite chambers 53 and 55 connected to input ports 30 and 32 respectively. The movable assembly 54 comprises a movable piston forming member 56 sealingly mounted to slide in a cylindrical bore 58 formed in the cover 48 and annular abutment means 60 urged by resilient means 62 and 64 in engagement with a fixed annular surface 66 formed by the bottom wall of cover 48.

In the embodiment shown, the annular abutment means 60 is comprised of two annular separate coaxial members 68 and 70, disposed in a stacking arrangement, biased into engagement with abutment 66 by springs 62 and 64 respectively. A first clearance is provided between member 68 and member 70 and a second clearance is provided between member 70 and a shoulder 74 formed in the bottom wall of bowl-shaped member 50. The annular member 68 is movable against the force of spring 62 to abut against member 70, the latter being also movable against the force of spring 64 to abut against shoulder 74. A preloaded spring 72 mounted between the bottom wall of cover 48 and the movable piston forming member 56 urges the latter in engagement with the abutment means 60. The force of spring 62 is greater than the force of spring 72 thereby permitting the piston forming member 56 to normally engage the annular member 68 which itself engages the abutment surface 66.

The distance between the sealing ring 76 of the piston forming member 56 thus positioned, and the free end 77 of bore 58 is greater than the length of the maximum stroke of annular member 68 thereby preventing any communication between chambers 53 and 55, for any position of the piston forming member.

A passage 78 is provided in the bottom wall of the bowl-shaped member 50 for the insertion of push-rod 40 into the housing 28. A seal 84 is provided between rod 40 and the bowl-shaped member 50 to avoid chamber 53 from communicating with the atmosphere. A spring 80 the force of which is smaller than that of spring 72 is mounted between the bottom of the bowl-shaped member 50 and a radial projection 82 of push-rod 40, urging the latter in continuous engagement with the piston forming member 56.

The operation of the control device shown in FIGS. 1 and 2 is as follows:

The vehicle has a normal trim corresponding to a minimum reference load distribution, when the vehicle is empty or with only the driver. The compression units 12 of the generating means 10 are then positioned or adjusted so that each piston depresses on a certain distance its corresponding diaphragm 16 toward the interior of the chamber 14. At the initial setting of the control device described hereabove, a fluid 10 is introduced into both chamber 14 by any known means so as to obtain, under such conditions, substantially equal fluid pressures within both conduits 34 and 36. Since the force of spring 62 is greater than that of spring 72 which is itself greater than that of spring 80, the movable assembly 54 then occupies its normal reference position, such as shown in FIG. 2, where the movable piston forming member 56 being only subjected to the forces of preloaded springs 72 and 80 engages the annular member 68 and where both annular members 68 and 78 are urged into engagement with the fixed abutment surface 66 by springs 62 and 64 respectively.

The manual presetting of the angular position of the headlights 46 is effected for this normal reference trim by acting upon the free threaded end 42 of push-rod 40 which latter may freely rotate with respect to casing 28.

When, during the operation of the vehicle, a new load distribution causes an increase in the load acting upon one axle, piston 20 of the compression unit 12 associated with said axle is biased toward the interior of the corresponding chamber 14 compressing the fluid contained therein. It results therefrom that the pressure level in the sealed system corresponding to said axle increases.

It is apparent that for any new load distribution which does not substantially modify the trim of the vehicle, the fluid pressure level in both chambers 53 and 55 remains substantially equal and the piston forming member 56 remains in its normal reference position.

Assuming, in a first case, that a new load distribution results in a nose-lift of the body of the vehicle, said nose-lift being caused, for example, by a lightening of the load acting on the front axle or by an overload on the rear axle. In such case, the fluid pressure level in chamber 53 operatively connected to the front axle, so that the piston forming member 56 is subjected to a differential pressure force which is directed toward the left, viewing FIG. 2.

When the differential pressure exceeds a first predetermined value corresponding to the calibrations of springs 62, 72 and 80, the annular member 68 is shifted by the piston forming member 56 against the force of spring 62. When the differential pressure attains a second predetermined value, the annular member 68 engages the annular member 70. The piston forming member 56 is thereby axially shifted from its reference position by a quantity equal to the clearance between the two annular members 68 and 70. When the differential pressure exceeds a third predetermined value corresponding to the collective force of springs 62, 72 and 80 plus the force of spring 64, the annular member 70 is then shifted by annular member 68, shifted in turn by the piston forming member 56. When the differential pressure attains a fourth predetermined value, the annular member 70 engages the fixed shoulder 74. The piston forming member is then axially moved from its original position by a quantity equal to the sum of the clearances provided between the annular members 68 and 70 and between the annular member 70 and the shoulder 74.

Thus the law governing the variations of the displacements of the piston forming member 56 presents a number of thresholds of steady equilibrium the outside limits of which depend on the aforesaid clearances and on the calibrations of the various springs. The aforesaid thresholds of equilibrium have a damping effect preventing important oscillations of the headlights to develop which otherwise would happen particularly when the vehicle is running on a degraded road.

Assuming now, in another case, that a new load distribution causes a nose dive of the vehicle body, with respect to the normal trim of the vehicle, due for example to an overload upon the front axle or a lightening of the load on the rear axle. In such case, the fluid pressure level in chamber 55 is below that of the fluid pressure level in chamber 53, so that the piston forming member 56 is subjected to a differential pressure force directed towards the right, viewing FIG. 2. When the differential pressure exceeds a fifth predetermined value corresponding to the calibration forces of springs 72 and 80, the piston forming member 56 moves from its normal reference position, as shown in FIG. 2, against the force of the preloaded spring 72, according to a law of variation which itself depends on the resilience of springs 72 and 80. It should be observed that the new law of variation of the displacements of the piston forming member 56 as a function of the differential pressure also provides a steady equilibrium threshold the limits of which depends on the calibrations of springs 72 and 80.

Another embodiment of a receiving means according to the invention is illustrated in FIG. 3. For the sake of clarity, the different parts of this second embodiment which are similar or equivalent to those of the first embodiment described hereinabove have been given the same reference numerals and will not be described again. The most important feature of the embodiment of FIG. 3 resides in a flexible diaphragm 100 sealingly pressed at its periphery between the bowl-shaped member 50 and the cover 48 of the casing 28 between the two chambers 53 and 55. The central portion of diaphragm 100 is set between two rigid circular flanges 102 and 104 to define the piston forming member 56 whereas the external annular portion of said diaphragm 100 is maintained in sealing engagement against the abutment surface 66 by annular elements 68 and 70 of the abutment means 60 under the action of springs 62 and 64. As shown in FIG. 3, spring 72 which is mounted between the bottom of cover 48 and flange 102 urges the piston forming member 56 into engagement with the annular element 68.

The operation of the receiving means shown in FIG. 3 is similar to the operation of the receiving means described hereinabove with reference to FIG. 2 and shall not be described in detail. However, the particular arrangement of diaphragm 100 which, as will be easily understood, defines a seal between each one of the elements 56, 68 and 70 of the movable assembly 54 and also between the latter and the casing 28 results in the following changes: in case a new load distribution causes a nose lift of the vehicle, with respect to its normal trim, the piston forming member 56 is then subjected to a differential pressure force directed toward the left viewing FIG. 3, as explained hereinabove. As soon as the differential pressure exceeds a first predetermined value corresponding to the total calibrations of springs 62, 72 and 80, the annular element 68 is pushed by the piston forming member 56 and is slightly shifted against the force of spring 62 thus disengaging a first annular surface of diaphragm 100. The disengagement of said annular surface suddenly increases the effective pressure responsive area of the piston forming member 56, so that the force of the differential pressure immediately urges annular element 68 into abutment against annular element 70. Similarly, as soon as the differential pressure exceeds the third predetermined value, such as defined hereinabove with reference to the embodiment of FIG. 2, and corresponding to the total forces of springs 62, 72 and 80 plus the calibration force of spring 64, the annular element 70 is pushed by annular element 68 itself pushed by the piston forming member 56, thereby slightly moving against the force of spring 64 and disengaging a second annular surface of diaphragm 100. The disengagement of said second annular surface suddenly increases the effective pressure responsive area of the piston forming member 56 so that the force of said differential pressure immediately urges said annular element 70 in abutment against said fixed shoulder 74.

It is clear that due to the increase in the effective surface of the piston forming member 56 upon shifting of one of the annular elements 68 and 70 against the force of spring 62, reverse motion should show some hysteresis. In effet, each annular element moves against the abutment surface 66 as shown as the differential pressure falls below a given fraction of the predetermined value which caused the shifting of said annular element against the force of spring 62, as will be easily understood by those skilled in the art.

What is claimed is:

1. A control system for modifying the angular position of the headlights of a vehicle, on either sides of a normal preset position, according to the trim of said vehicle, said system comprising generating means responsive to the load acting upon at least one axle of said vehicle and designed for generating a differential control pressure which varies as a function of the trim of the vehicle, at least one receiving means comprising a casing, a movable assembly mounted in said casing and subjected on the one hand to the action of first preloaded resilient means yieldably urging said movable assembly in its normal position into engagement with a fixed abutment surface of said casing and a force transmitting connection of adjustable length located between said movable assembly and the headlights of the vehicle for enabling said receiving means to vary the angular position of said headlights as a function of said differential pressure, said movable assembly comprising movable abutment means normally urged into engagement with said fixed abutment surface by said first resilient means and a piston forming member connected to the headlights of the vehicle by said force transmitting connection and subjected on the one hand to said differential control pressure and on the other hand to the action of second preloaded resilient means mounted so as to normally urge said piston forming member into engagement with said movable abutment means.

2. A control system according to claim 1 wherein said movable abutment means comprise coaxial annular elements disposed in a stacked relationship and urged toward their normal position into engagement with said fixed abutment surface by respective preloaded springs which latter constitute said first preloaded resilient means, each one of said annular element being shiftable a given distance from its normal position against the force of its corresponding preloaded spring before abutting the adjoining annular element.

3. A control system according to claim 1 wherein sealing means are provided between said piston forming member, said movable abutment means and said casing, said movable abutment means being designed to come into sealing engagement with said fixed abutment surface, whereby the effective pressure responsive area of said movable assembly subjected to said differential pressure substantially increases when said piston forming member disengages said movable abutment means from said fixed abutment surface against the force of said first resilient means.

4. A control system according to claim 3 wherein said movable abutment means comprise independant coaxial annular elements in a stacked arrangement, said elements being fluid-tightly shiftable one with respect to the other within said casing and being urged toward their normal position into sealing engagement with said fixed abutment surface by a corresponding assembly of preloaded springs which constitute said first preloaded resilient means, each one of said elements being shiftable a given distance from its normal position before abutting against the adjoining annular element, whereby a substantial increase in the effective area of said movable assembly, subjected to said differential pressure, is obtained.

5. A control system according to claim 3 wherein said sealing means comprise a flexible diaphragm sealingly secured at its periphery to said casing, and cooperating with said fixed abutment surface to permit said movable abutment means to come into sealing engagement with said fixed abutment surface, the central portion of said diaphragm defining said piston forming member.

* * * * *